(12) United States Patent
Huang et al.

(10) Patent No.: US 10,081,077 B2
(45) Date of Patent: Sep. 25, 2018

(54) DEVICE FOR HEATING TO GENERATE UNIFORM MOTLEN POOL

(71) Applicant: INDUSTRIAL TECHNOLOGY RESEARCH INSTITUTE, Hsinchu, Hsien (TW)

(72) Inventors: Kuang-Yao Huang, Hsinchu (TW); Chien-Jung Huang, Hsinchu (TW); Kuo-Tso Chen, Hsinchu (TW); Chun-Jen Gu, Hsinchu (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 499 days.

(21) Appl. No.: 14/981,359

(22) Filed: Dec. 28, 2015

(65) Prior Publication Data
US 2017/0151630 A1  Jun. 1, 2017

(30) Foreign Application Priority Data
Nov. 27, 2015  (TW) .............................. 104139624 A

(51) Int. Cl.
*B23K 26/06* (2014.01)
*B23K 26/342* (2014.01)
(Continued)

(52) U.S. Cl.
CPC ...... *B23K 26/0626* (2013.01); *B23K 26/0648* (2013.01); *B23K 26/0665* (2013.01);
(Continued)

(58) Field of Classification Search
CPC .............. B23K 26/0626; B23K 26/073; B23K 26/0648; B23K 26/0665; B23K 26/342
(Continued)

(56) References Cited

U.S. PATENT DOCUMENTS

| 4,566,765 A | 1/1986 | Miyauchi et al. |
| 6,590,637 B2 | 7/2003 | Nishi |

(Continued)

FOREIGN PATENT DOCUMENTS

| TW | 201235620 A | 9/2012 |
| TW | 201323854 A | 6/2013 |
| TW | I454331 B | 10/2014 |

OTHER PUBLICATIONS

Zhang,Thermal Modeling and Laser Beam Shaping for Microvias Drilling in High Density Packaging, thesis, 2008, pp. 1-246.
(Continued)

*Primary Examiner* — Samuel M Heinrich
(74) *Attorney, Agent, or Firm* — Rabin & Berdo, P.C.

(57) ABSTRACT

This disclosure provides a device for heating to generate a uniform molten pool, including: a source unit for generating an energy beam; a beam expanding/reducing unit positioned in an energy path of the energy beam for adjusting the diameter of the energy beam; a flat-top conical lens set positioned in the energy path and including at least two flat-top axicons, with the beam expanding/reducing unit positioned between the source unit and the flat-top conical lens set; and a focusing lens positioned in the energy path, with the flat-top conical lens set between the beam expanding/reducing unit and the focusing lens, and the energy beam being focused by the focusing lens. This disclosure generates a uniform molten pool to prevent vaporization splash due to overheating of the material during melting.

23 Claims, 17 Drawing Sheets

(51) Int. Cl.
*B23K 26/073* (2006.01)
*B23K 26/34* (2014.01)
(52) U.S. Cl.
CPC ........ *B23K 26/073* (2013.01); *B23K 26/0734* (2013.01); *B23K 26/34* (2013.01); *B23K 26/342* (2015.10)
(58) Field of Classification Search
USPC ...................................... 219/121.63–121.72
See application file for complete search history.

(56) References Cited

U.S. PATENT DOCUMENTS

| | | | |
|---|---|---|---|
| 7,630,147 | B1 | 12/2009 | Kar et al. |
| 8,050,164 | B2 * | 11/2011 | Minabe ................ G03H 1/0465 369/103 |
| 8,234,770 | B2 | 8/2012 | Durandet et al. |
| 8,334,478 | B2 | 12/2012 | Kono |
| 9,201,008 | B2 * | 12/2015 | Theriault ................ G01N 21/64 |
| 2004/0238110 | A1 | 12/2004 | Flanagan |
| 2007/0170154 | A1 | 7/2007 | Shimomura et al. |
| 2008/0023453 | A1 | 1/2008 | Zhang |
| 2011/0259860 | A1 | 10/2011 | Bass et al. |

OTHER PUBLICATIONS

Dong et al., A generation method of tunable cylindrical vector ring beam, Optics and Lasers in Engineering, Jun. 2012, pp. 1823-1827.
Zhao et al., An approach to achieve lateral super resolution for small probe confocal measurement system and its element, Optik, May 2005, pp. 557-562.
Taiwan Patent Office, Office Action, Patent Application Serial No. TW104139624, dated May 17, 2017, Taiwan.

* cited by examiner

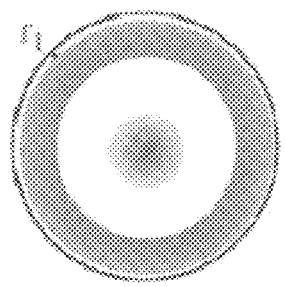 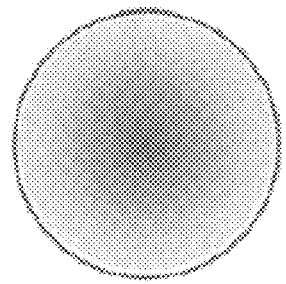
FIG. 2A-1  FIG. 2A-2(PRIOR ART)
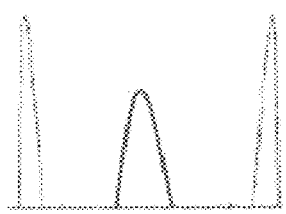 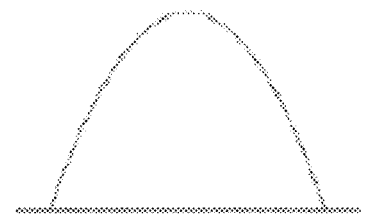
FIG. 2B-1  FIG. 2B-2(PRIOR ART)
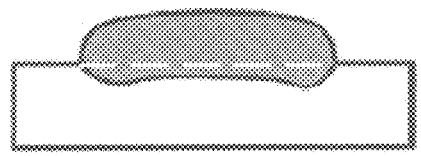 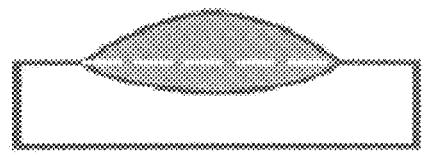
FIG. 2C-1  FIG. 2C-2(PRIOR ART)
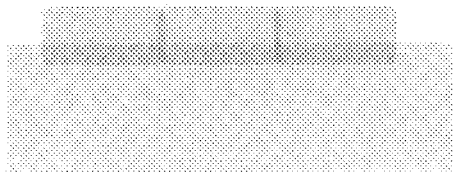 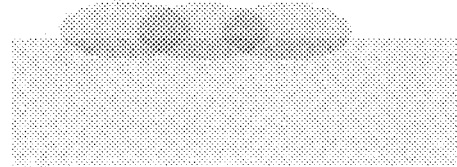
FIG. 2D-1  FIG. 2D-2(PRIOR ART)

DEVICE FOR HEATING TO GENERATE UNIFORM MOTLEN POOL

CROSS-REFERENCE TO RELATED APPLICATION

The present application is based on, and claims priority from Taiwan Application Number 104139624, filed Nov. 27, 2015, the disclosure of which is hereby incorporated by reference herein in its entirety.

TECHNICAL FIELD

The present disclosure relates to devices for heating to generate a uniform molten pool.

BACKGROUND

Traditionally, Gaussian or flat-top beams are used to melt solid material in laser cladding process (applicable in 3D printing field) or welding. Although they can melt solid material quickly, the energy at the center point of the Gaussian spot is highly concentrated, sometimes resulting in overheating and causing vaporization to occur. The vaporized molecules, when leaving the surface, will cause a recoil pressure that pushes the molten pool, which often causes splashing of the material and depressions formed on the surface. Also, as the energy of the center point of the Gaussian beam is higher, the shape of the weld beads appears oval-like. This give rise to higher overlapping rates between the molten areas in the laser cladding process or the weld beads, sometimes even as high as 50%. Therefore, the production rate of the process is relatively low.

Therefore, there is an urgent need in this field to design a device for heating to generate a uniform molten pool that, in particular, eliminates vaporization of the material, creates uniform weld beads and reduces the overlapping rate of the weld beads or the molten areas in the laser cladding process.

SUMMARY

The present disclosure provides a device for heating to generate a uniform molten pool, which may include: a source unit for generating an energy beam; a beam expanding/reducing unit positioned in an energy path of the energy beam for adjusting the diameter of the energy beam; a flat-top conical lens set positioned in the energy path and including at least two flat-top axicons, the beam expanding/reducing unit being positioned between the source unit and the flat-top conical lens set; and a focusing lens positioned in the energy path for focusing the energy beam, the flat-top axicons set being positioned between the beam expanding/reducing unit and the focusing lens.

In the device for heating to generate a uniform molten pool in accordance with the present disclosure, the two flat-top axicons are a first flat-top axicon and a second flat-top axicon, wherein the first flat-top axicon includes a first top face and a first bottom face connected to the first top face by a first side face, and the second flat-top axicon includes a second top face and a second bottom face connected to the second top face by a second side face, and the first top face and the second top face are positioned such that they face each other.

BRIEF DESCRIPTION OF THE DRAWINGS

The present disclosure can be more fully understood by reading the following detailed descriptions of the preferred embodiments, with reference made to the accompanying drawings, wherein:

FIGS. 2A-1, 2B-1, 2C-1 and 2D-1 are schematic diagrams illustrating a beam pattern, an energy distribution, a weld bead shape and weld bead overlaps from the device for heating to generate a uniform molten pool in accordance with the present disclosure, respectively;

FIGS. 2A-2, 2B-2, 2C-2 and 2D-2 are schematic diagrams illustrating a beam pattern, an energy distribution, a weld bead shape and weld bead overlaps from a prior-art device for heating to generate a uniform molten pool, respectively;

FIG. 3 is a graph depicting light intensity distribution of a beam pattern (Gaussian beam pattern) outputted by a prior-art device for heating to generate a uniform molten pool, a beam pattern (flat-top beam pattern) outputted by another prior-art device for heating to generate a uniform molten pool, and a beam pattern outputted by the device for heating to generate a uniform molten pool in accordance with the present disclosure;

FIGS. 8A-1 to 8A-3 are graphs depicting relationships between the diameters of the Gaussian beam patterns hitting the material surfaces and the distances between the two flat-top axicons under the circumstances of different distances of the materials from the centers of focusing lenses (i.e., the distances from focuses) and different ratios of the diameters of the Gaussian beam patterns entering the flat-top conical lens sets to the diameters of the top faces of the incident flat-top axicons; and FIGS. 8B-1 to 8B-3 are graphs depicting the relationships between the annular widths of the annular patterns hitting the material surfaces and the distances between the two flat-top axicons under the circumstances of different ratios of the diameters of the Gaussian beam patterns entering the flat-top conical lens sets to the diameters of the top faces of the incident flat-top axicons.

DETAILED DESCRIPTION OF THE EMBODIMENTS

Figure 1A:
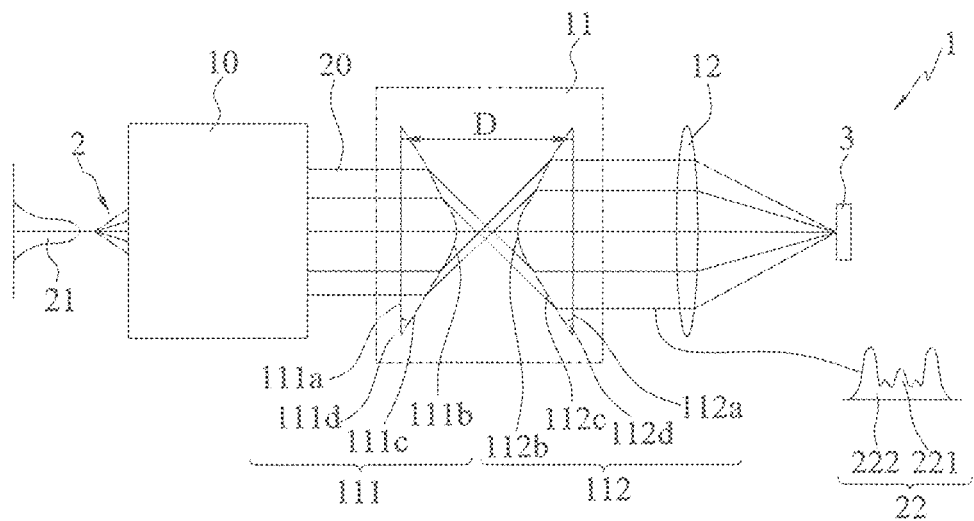
FIGS. 1A, 1B, 1C-1 to 1C-5 and 1D-1 to 1D-4 are diagrams depicting the energy paths of the devices for heating to generate a uniform molten pool in accordance with the present disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Referring to FIGS. 1A, 1B, 1C-1 to 1C-5 and 1D-1 to 1D-4, diagrams depicting the energy paths of devices for heating to generate a uniform molten pool 1 in accordance with the present disclosure are shown, wherein FIGS. 1C-2 to 1C-5 and 1D-2 to 1D-4 are enlarged views of the energy paths from source units and before striking a flat-top conical lens set in the devices for heating to generate a uniform molten pool in accordance with the present disclosure. An energy beam can be emitted from the source unit 2 or applied externally. The pattern of the energy beam at the source unit 2 can be a Gaussian beam pattern 21 or a multi-mode beam pattern (not shown). Then the energy beam enters into a beam expanding/reducing unit 10 before entering into the flat-top conical lens set 11, which generate an energy beam with a pattern 22 made up of a Gaussian beam pattern with a reduced magnitude 221 and an annular pattern 222. This energy beam is then focused by a focusing lens 12 (in such a way as to focus the pattern 22). Thereafter, the energy beam can be projected onto a material 3 for heating the material 3 in order to generate a uniform molten pool.

The aforementioned energy beam can be an energy beam of high-energy rays, visible, invisible, microwave radiation or a combinations thereof. The energy beam can be an externally applied energy beam. More particularly, it can be visible or invisible light. The form of energy beam generated by the source unit 2 may be a point source or a collimated light source. More particularly, the energy beam can be a laser, a point source or a light source emitted from laser through an optical fiber unit.

The forms of energy beams generated by the aforementioned beam expanding/reducing unit 10 and the source unit 2 may come in a plurality of combinations to expand and output the diameter of the Gaussian beam pattern 21 entering the beam expanding/reducing unit 10. More specifically, the diameter of the Gaussian beam pattern 21 being expanded and outputted from the beam expanding/reducing unit 10 before entering the flat-top conical lens set 11 can be between 3 mm to 40 mm. The combinations of the forms of the energy beams generated by the aforementioned beam expanding/reducing unit 10 and the source unit 2 may be as follows: (1) the energy beam generated by the source unit 2 is in the form of a point source (a general point source, a laser exceeding the collimated distance or a light source emitted from a laser through an optical fiber unit), and the beam expanding/reducing unit 10 is a first convex lens 101; (2) the energy beam generated by the source unit 2 is in the form of a point source or a collimated light source, and the beam expanding/reducing unit 10 is a combination of a first convex lens 101 and a second convex lens 102; (3) the energy beam generated by the source unit 2 is in the form of a collimated light source (e.g., a laser or parallel light converted from a point source via a lens), and the beam expanding/reducing unit 10 is a combination of a first convex lens 101, a second convex lens 102 and a concave lens 103; (4) the energy beam generated by the source unit 2 is in the form of a point source, and the beam expanding/reducing unit 10 is a combination of a first convex lens 101 and a second convex lens 102, and a third convex lens 13 is included between the source unit 2 and the first convex lens 101; or (5) the energy beam generated by the source unit 2 is in the form of a point source, and the beam expanding/reducing unit 10 is a combination of a first convex lens 101, a second convex lens 102 and a concave lens 103, and a third convex lens 13 is included between the source unit 2 and the first convex lens 101. Nevertheless, the present disclosure may employ other types of beam expanding/reducing unit 10 and additional accommodating optical elements depending on specific optical designs.

Figure 1B:
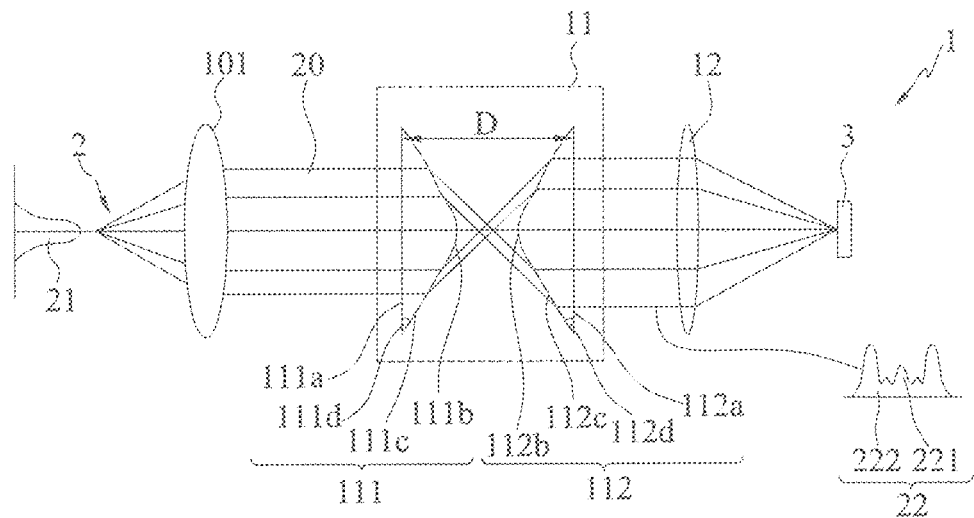

Referring to FIG. 1B, in the case that the energy beam generated by the source unit 2 is in the form of a point source and the beam expanding/reducing unit 10 is a first convex lens 101, the first convex lens 101 may be positioned in the energy path of the energy beam for adjusting the diameter of the energy beam. The energy beam generated by the source unit 2 may be a general point source, a laser exceeding collimated distance or a light source emitted from a laser through an optical fiber unit.

The aforementioned flat-top conical lens set 11 may be positioned in the energy path, and the first convex lens 101 is positioned in the energy path between the source unit 2 and the flat-top conical lens set 11. The flat-top conical lens set 11 include at least two flat-top axicons (i.e., a first flat-top axicon 111 and a second flat-top axicon 112) for converting the energy beam 20 having a Gaussian beam pattern (when entering the flat-top conical lens set 11) into an energy beam having a combination of a Gaussian beam pattern with a reduced magnitude 221 and an annular pattern 222 (when coming out of flat-top conical lens set 11). The first flat-top axicon 111 in accordance with the present disclosure includes a first top face 111b and a first bottom face 111a opposite to each other. The first top face 111b and the first bottom face 111a are connected with first side faces 111c therebetween. A first angle 111d is created between the first side face 111c and the first bottom face 111a. Similarly, the second flat-top axicon 112 includes a second top face 112b and a second bottom face 112a opposite to each other. The second top face 112b and the second bottom face 112a are connected with second side faces 112c therebetween. A second angle 112d is created between the second side face 112c and the second bottom face 112a. In addition, the first flat-top axicon 111 and the second flat-top axicon 112 in accordance with present disclosure may have a number of possible design values or in a number of possible physical arrangements. For example, the first top face 111b and the second top face 112b may face each other, and the first flat-top axicon 111 and the second flat-top axicon 112 are spaced apart. More specifically, there is a distance D between the first bottom face 111a and the second bottom face 112a, and the distance D is adjustable. In particular, the distance D may be between 40 mm and 85 mm. As an example, the diameter of the first top face 111b or the second top face 112b may be between 1 mm and 5 mm. As another example, the first angle 111d or the second angle 112d may be between 5 degrees and 40 degrees. As yet another example, the values of the first top face 111b, the first bottom face 111a and the first angle 111d of the first flat-top axicon 111 may be different from or the same as those of the second top face 112b, the second bottom face 112a and the second angle 112d of the second flat-top axicon 112.

The aforementioned focusing lens 12 may be positioned in the energy path of the energy beam, and the flat-top conical lens set 11 may be positioned between the first convex lens 101 and the focusing lens 12. The focusing lens 12 is used for focusing and projecting the energy beam with a combination of the Gaussian beam pattern with a reduced magnitude 221 and the annular pattern 222 onto the material 3 to heat up the material 3 and generate a uniform molten pool therein, thereby preventing vaporization splash due to overheating during melting of the material 3. Additionally, the diameter of the focusing lens 12 may be greater than that of the annular pattern 222 entering the focusing lens 12, and the distance between the material 3 and the focusing lens 12 is adjustable. That is, under the circumstances that the focusing lens 12 has a focal length, the distance between the surface of the material 3 and the focus point may be between ±20 mm.

Figures 1, 1C:
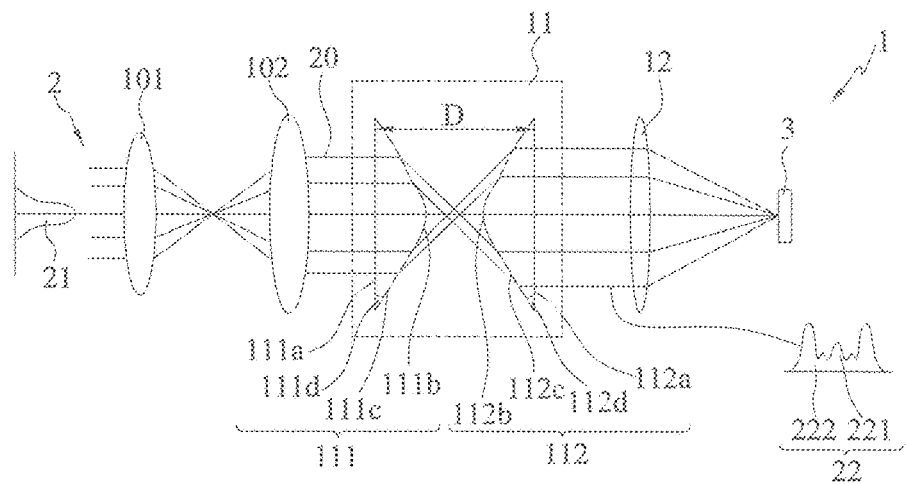

Referring to FIG. 1C-1, in the case that the energy beam generated by the source unit 2 is in the form of a collimated light source (e.g., a laser in the collimated distance) and the beam expanding/reducing unit 10 is made up of the first convex lens 101 and the second convex lens 102, the first convex lens 101 and the second convex lens 102 may be positioned in the energy path of the energy beam for adjusting the diameter of the energy beam. In addition, an aperture can be positioned between the first convex lens 101 and the second convex lens 102. It may be positioned at the intersection of lights between the first convex lens 101 and the second convex lens 102 (this circumstance is not shown) for filtering out the patterns of other modes except the Gaussian beam pattern in the energy beam.

Referring to FIGS. 1C-2 and 1C-5, in the case that the energy beam generated by the source unit 2 is in the form of a point source (a general point source, a laser exceeding the collimated distance or a light source emitted from a laser through an optical fiber unit), the beam expanding/reducing unit 10 is a first convex lens 101, the beam expanding/reducing unit 10 is a combination of the first convex lens 101 and the second convex lens 102, or a combination of the first convex lens 101 and the concave lens 103, and the device for heating to generate a uniform molten pool 1 further includes the third convex lens 13 between the source unit 2 and the beam expanding/reducing unit 10 for converting the point source into parallel light before entering into the beam expanding/reducing unit 10. Referring to FIG. 1D-1, in the case that the energy beam generated by the source unit 2 is in the form of a collimated light source and the beam expanding/reducing unit 10 is a combination of the first convex lens 101, the concave lens 103, and the second convex lens 102, the first convex lens 101, the concave lens 103, and the second convex lens 102 may be positioned in the energy path of the energy beam for adjusting the diameter of the energy beam.

Referring to FIGS. 1D-2 to 1D-4, in the case that the energy beam generated by the source unit 2 is in the form of a point source and the beam expanding/reducing unit 10 is a combination of the first convex lens 101, the concave lens 103, and the second convex lens 102, the device for heating to generate a uniform molten pool 1 further includes the third convex lens 13 positioned between the source unit 2 and the beam expanding/reducing unit 10 for converting the point source into parallel light before entering into the beam expanding/reducing unit 10. The position of the concave lens 103 can also be adjusted to adjust the diameter of the outgoing energy beam.

Figures 1, 1C, 2:
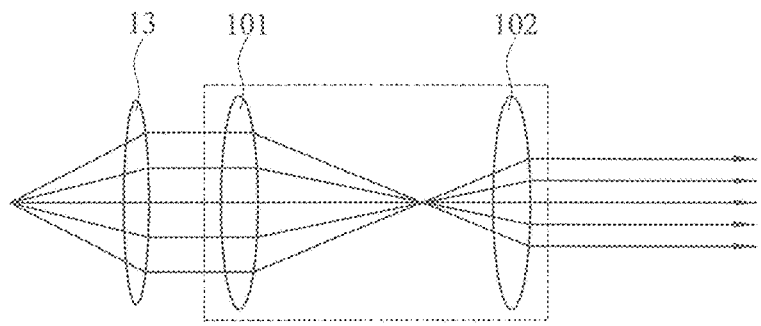

FIGS. 2A-1, 2B-1, 2C-1 and 2D-1 are schematic diagrams illustrating a beam pattern, an energy distribution, a weld bead shape and weld bead overlaps from the device for heating to generate a uniform molten pool in accordance with the present disclosure, respectively, and FIGS. 2A-2, 2B-2, 2C-2 and 2D-2 are schematic diagrams illustrating a beam pattern, an energy distribution, a weld bead shape and weld bead overlaps from a prior-art device for heating to generate a uniform molten pool, respectively. As shown in FIGS. 2A-1 and 2B-1, as the beam pattern and the energy distribution outputted by the device for heating to generate a uniform molten pool 1 of the present disclosure are results of a combination of a Gaussian beam pattern with a reduced magnitude and an annular pattern, the resulting weld bead shape (i.e., the shape of the molten material) and the weld bead overlaps are shown in FIGS. 2C-1 and 2D-1, respectively, the depths of the molten pool formed are more uniform, resulting in a more rectangular-like bead shape. If the combination of the Gaussian beam pattern with a reduced magnitude and the annular pattern is used, the bead overlap ratio is lower as the shape of the bead is more like a rectangular, thus increasing the production rate of the manufacturing process. In the laser cladding process, the same results can be achieved. On the other hand, the beam pattern (Gaussian beam pattern) and the energy distribution outputted by the prior-art device for heating to generate a uniform molten pool as shown in FIGS. 2A-2 and 2B-2, respectively, produce an oval-like weld bead shape and a higher overlapping ratio of the weld beads as shown in FIGS. 2C-2 and 2D-2, respectively, thus resulting in a lower production rate.

Figures 1, 1C, 2, 3:
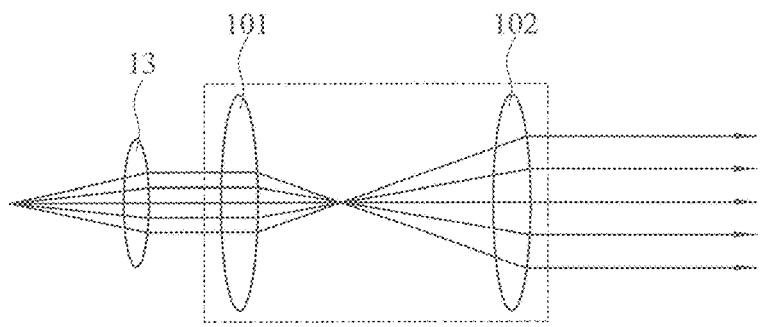
Figures 1, 1C, 2, 3, 4:
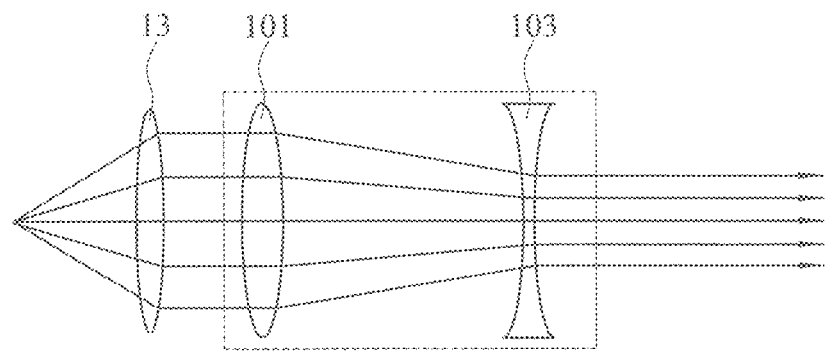
Figures 1, 1C, 2, 3, 4, 5:
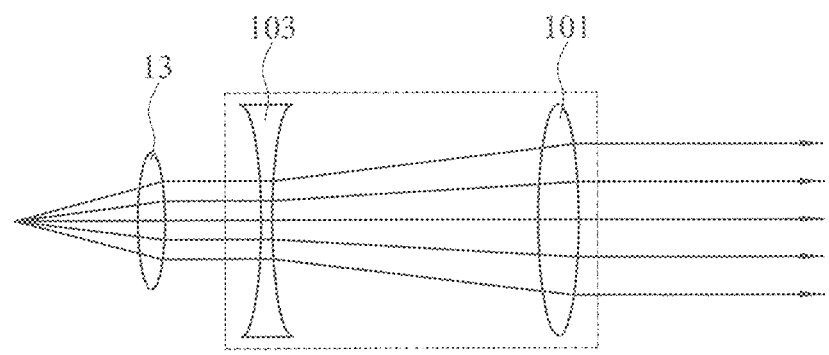
Figures 1, 1D:
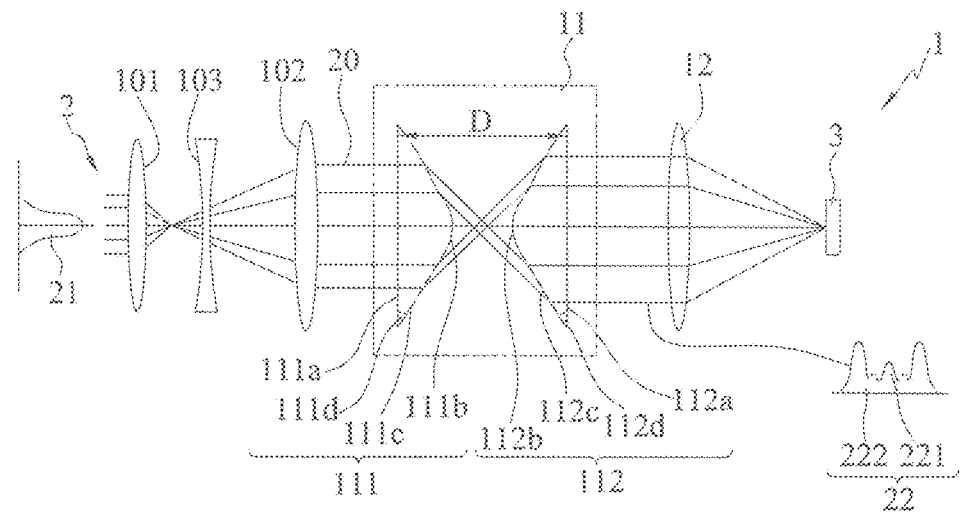
Figures 1, 1D, 2:
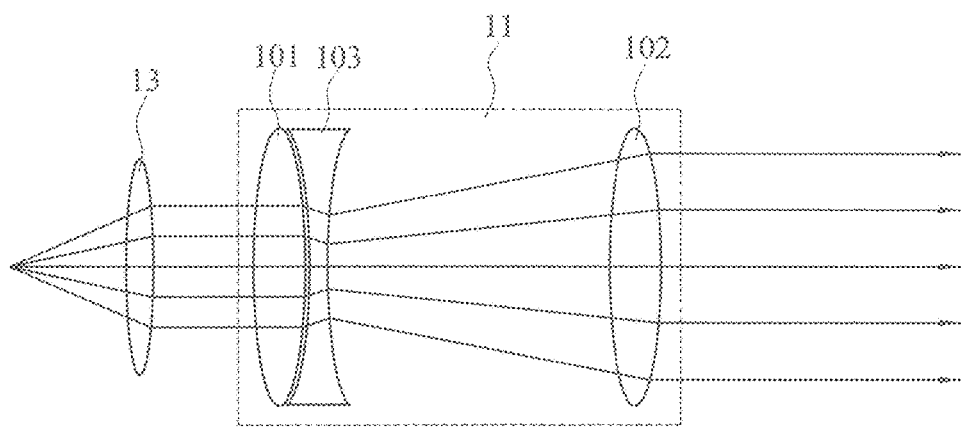
Figures 1, 1D, 2, 3:
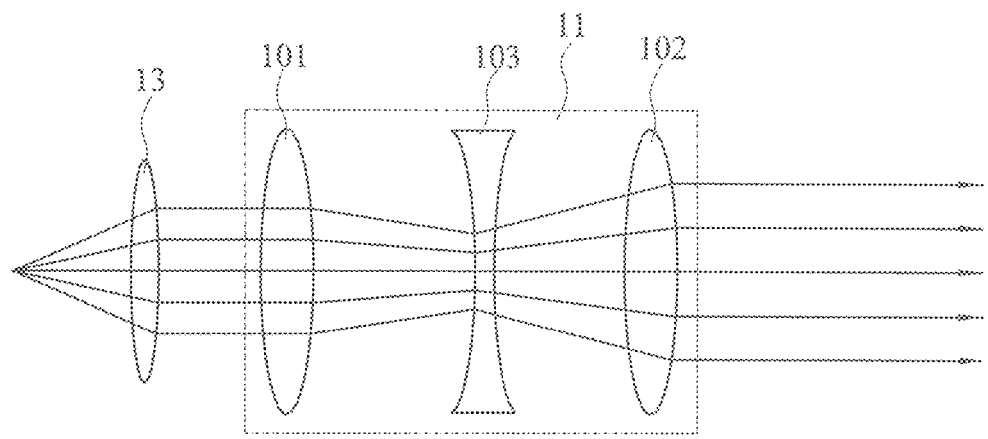
Figures 1, 1D, 2, 3, 4:
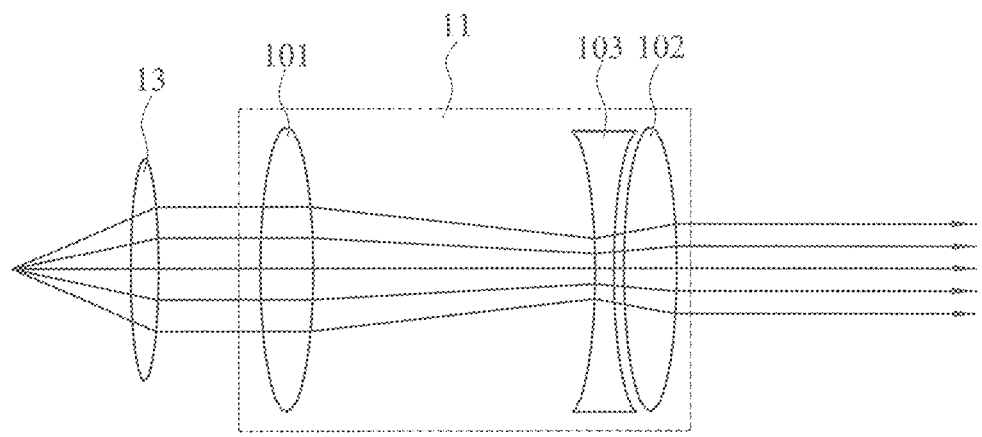
Figure 3:
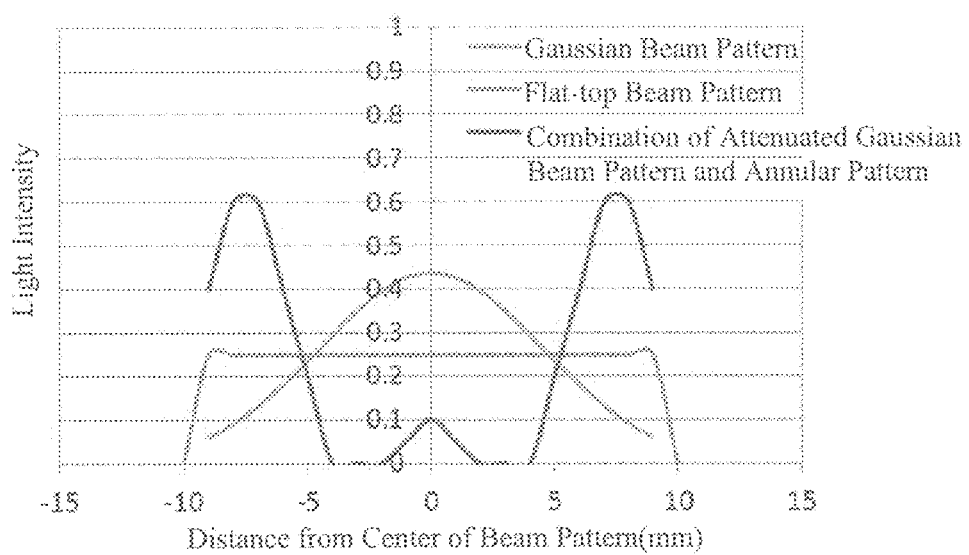
Figure 4A:
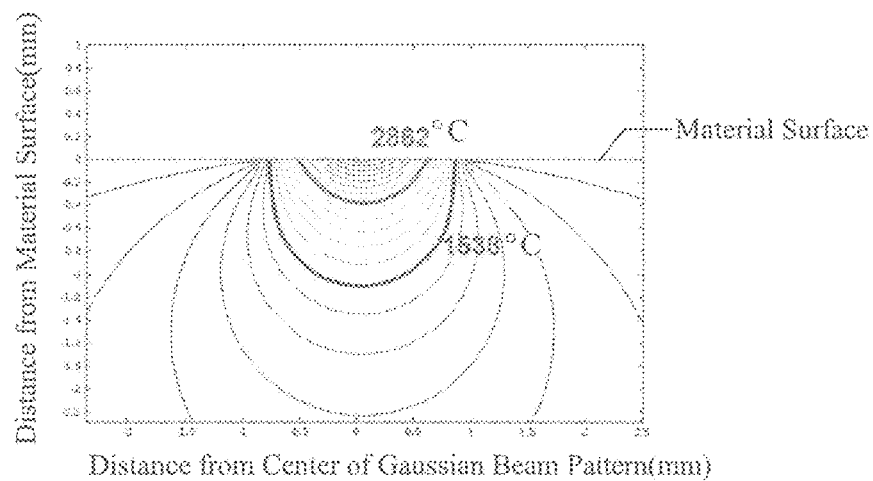
FIGS. 4(A) to 4(C) are heat distribution graphs in materials for a Gaussian beam pattern, a flat-top beam pattern and a beam pattern outputted by the device for heating to generate a uniform molten pool in accordance with the present disclosure, from top to bottom.
Figure 4B:
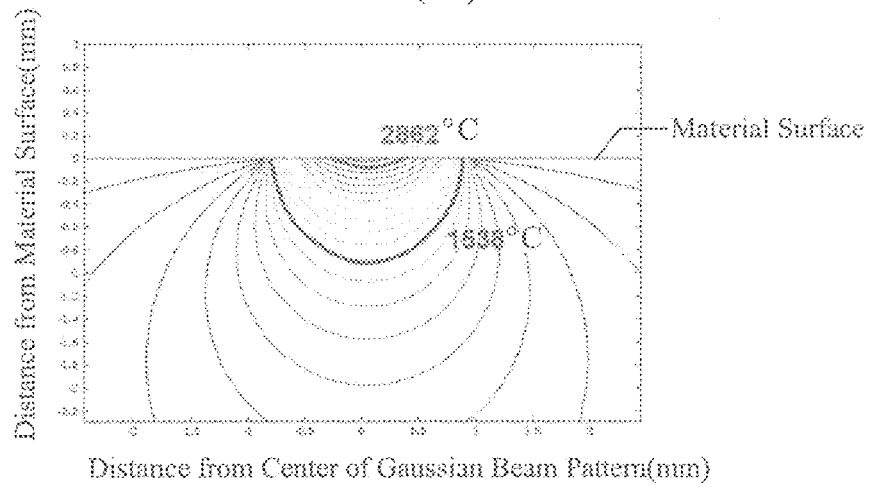
Figure 4C:
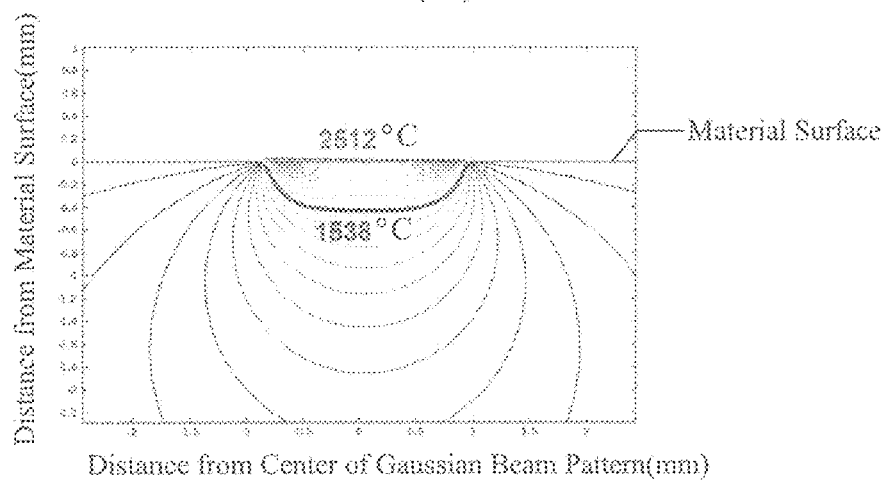

FIG. 3 is a graph depicting light intensity distribution of a beam pattern (Gaussian beam pattern) outputted by a prior-art device for heating to generate a uniform molten pool, a beam pattern (flat-top beam pattern) outputted by another prior-art device for heating to generate a uniform molten pool, and a beam pattern outputted by the device for heating to generate a uniform molten pool in accordance with the present disclosure. FIGS. 4(A)-4(C) are heat distribution graphs in materials for a Gaussian beam pattern, a flat-top beam pattern and a beam pattern outputted by the device for heating to generate a uniform molten pool in accordance with the present disclosure, from top to bottom. As can be seen from FIGS. 4(A) and 4(B), if the material is iron (iron has a melting point of 1538°C. and a boiling point of 2862°C.), then both irons heated by the Gaussian beam pattern and the flat-top beam pattern will reach the boiling point (2862°C.). This will result in the undesirable splashing of the molten material and depression of the molten pool due to the vaporization recoil pressure. On the other hand, the material heated by the beam pattern outputted by the device for heating to generate a uniform molten pool of the present disclosure only reaches a temperature that is above the melting point and below the boiling point, so the aforementioned issues will not be present.

Figure 5A:
FIG. 5A is a graph illustrating the relationship between a ratio of the annular pattern energy outputted by the device for heating to generate a uniform molten pool of the present disclosure to the total incident energy and a ratio of the diameter of the Gaussian beam pattern entering the flat-top conical lens set to the diameter of the top face of the flat-top conical lens set.
Figure 5B:
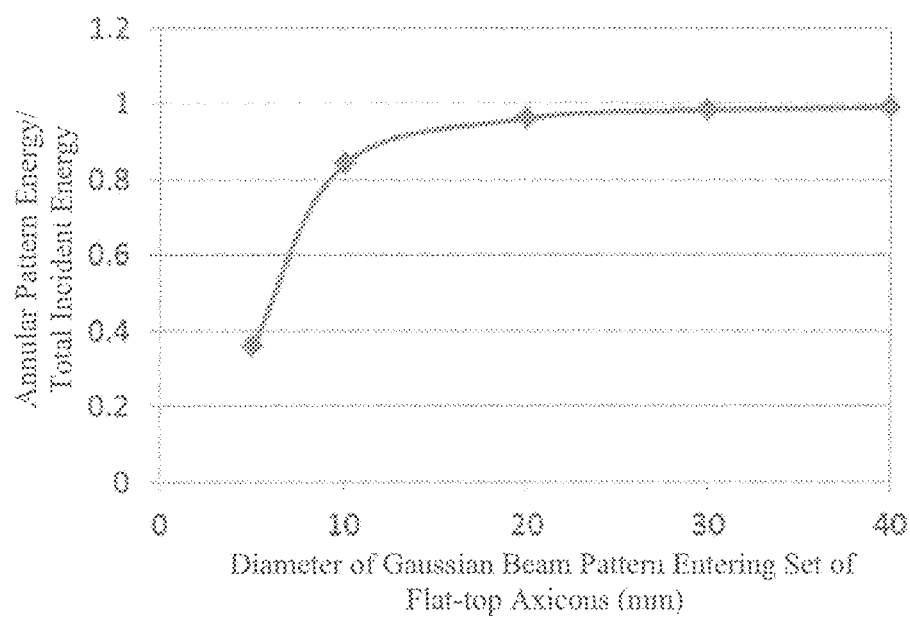
FIG. 5B is a graph illustrating the relationship between a ratio of the annular pattern energy outputted by the device for heating to generate a uniform molten pool of the present disclosure to the total incident energy and the diameter of the Gaussian beam pattern entering the flat-top conical lens set.

FIG. 5A is a graph illustrating the relationship between a ratio of the annular pattern energy outputted by the device for heating to generate a uniform molten pool of the present disclosure to the total incident energy and a ratio of the diameter of the Gaussian beam pattern entering the flat-top conical lens set to the diameter of the top face of the flat-top conical lens set (i.e., the diameter of the top face of the first flat-top axicon encountered, which can be the first top face or the second top face). It can be noted that different ratios of the diameter of the Gaussian beam pattern entering the flat-top conical lens set to the diameter of the top face of the flat-top conical lens set will result in different ratios of beam penetration to refraction, which in turn result in different ratios of the annular pattern energy outputted to the total incident energy. The ratio of the diameter of the Gaussian beam pattern entering the flat-top conical lens set to the diameter of the top face of the flat-top conical lens set is between 1 and 10. More specifically, as shown in FIG. 5B, different laser beam diameters will result in different ratios of beam penetration to refraction, wherein the penetrating beam will form the Gaussian beam pattern with a reduced magnitude, while the refracted beam will form the annular pattern, and the ratio of these two depends on the circular area ratio of the top face radius r to the bottom face radius R of the flat-top axicon, which can be represented by the following equation (1). The greater the diameter of the Gaussian beam pattern entering the flat-top conical lens set, the greater the ratio of the annular pattern energy to the total energy, wherein variation is greatest in the range of 5 to 10 mm of the beam size, beyond 10 mm, variation slows down. This can be taken into consideration when designing the beam magnification of the beam expanding/reducing unit 10.

$$\text{(Energy of Output Annular Pattern–Energy of Gaussian Beam with Reduced Magnitude)/Total incident Energy} = (R^2 - r^2)/R^2 \quad (1)$$

Figure 6:
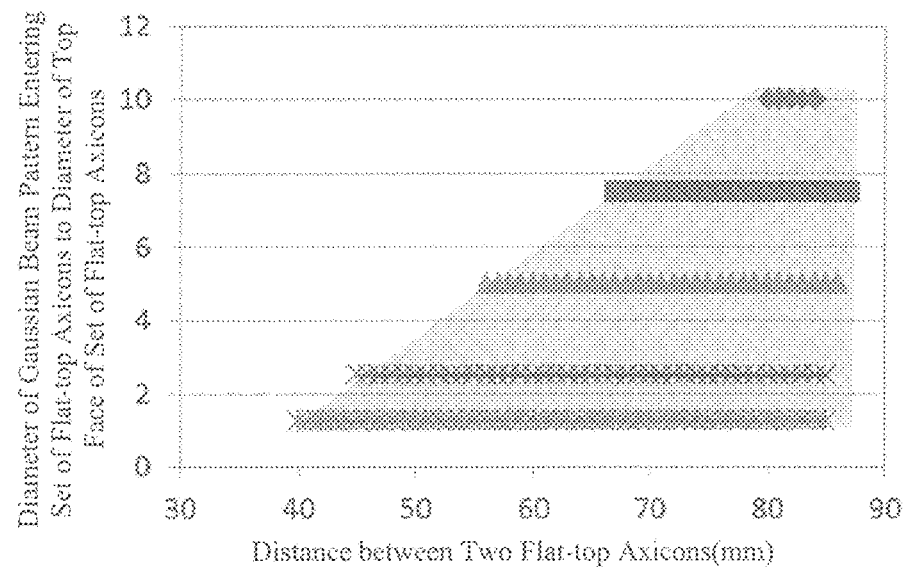
FIG. 6 is a graph depicting the relationship between the ratio of the diameter of the Gaussian beam pattern entering the flat-top conical lens set to the diameter of the top face of the incident flat-top axicon and the distance between the two flat-top axicons under the circumstances of different diameters of the Gaussian beam pattern entering the flat-top conical lens set.
Figure 7A:
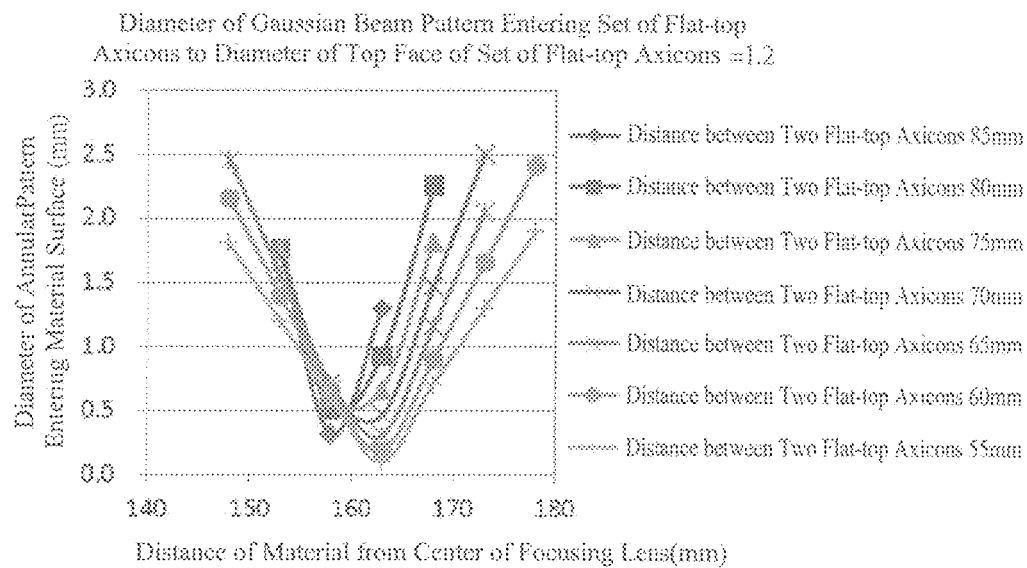
FIGS. 7A to 7E are graphs depicting the changes in relationships between the diameters of the annular patterns coming out of the flat-top conical lens sets and the distances of the materials from the centers of focusing lenses (i.e., the distances from focuses) as a result of different distances between the two flat-top axicons when the ratios of the diameters of the Gaussian beam patterns entering the flat-top conical lens sets to the diameters of the top faces of the incident flat-top axicons are 1.2, 2.5, 5, 7.5 and 10, respectively.
Figure 7B:
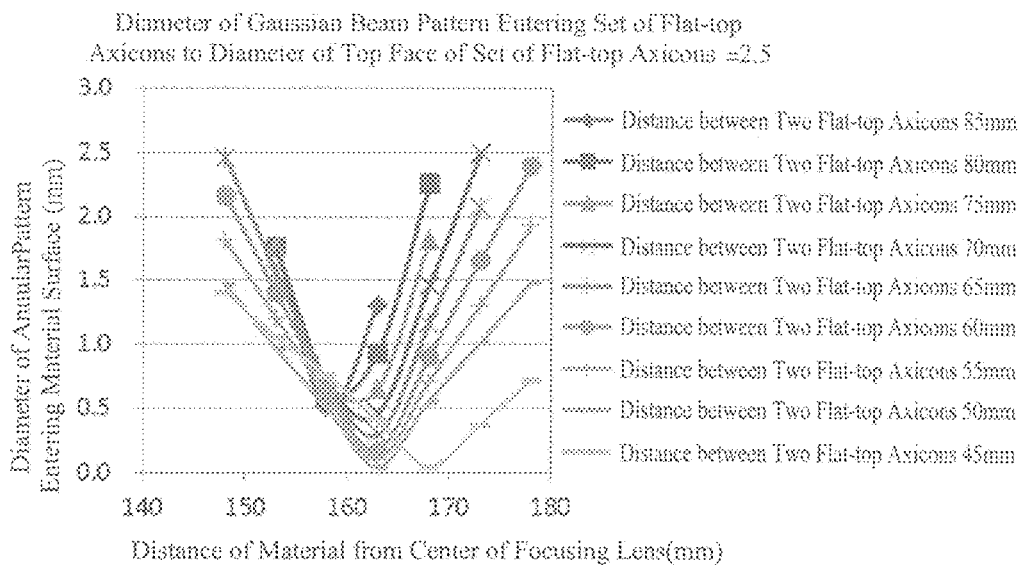
Figure 7C:
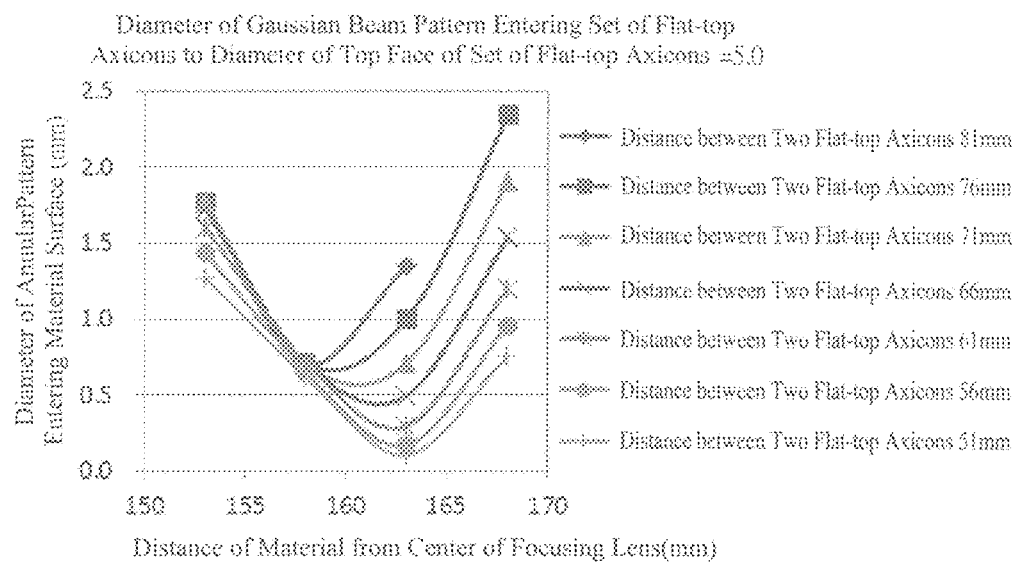
Figure 7D:
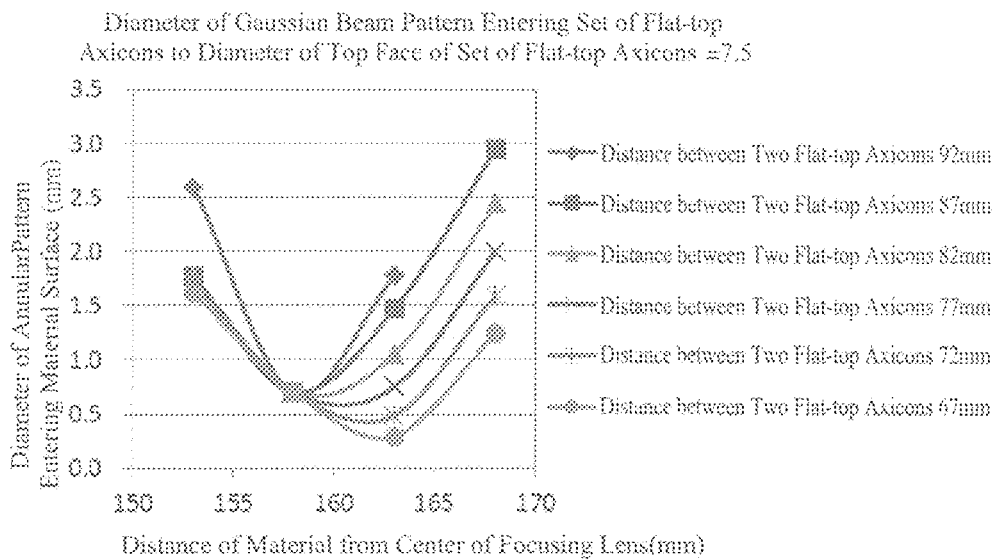
Figure 7E:
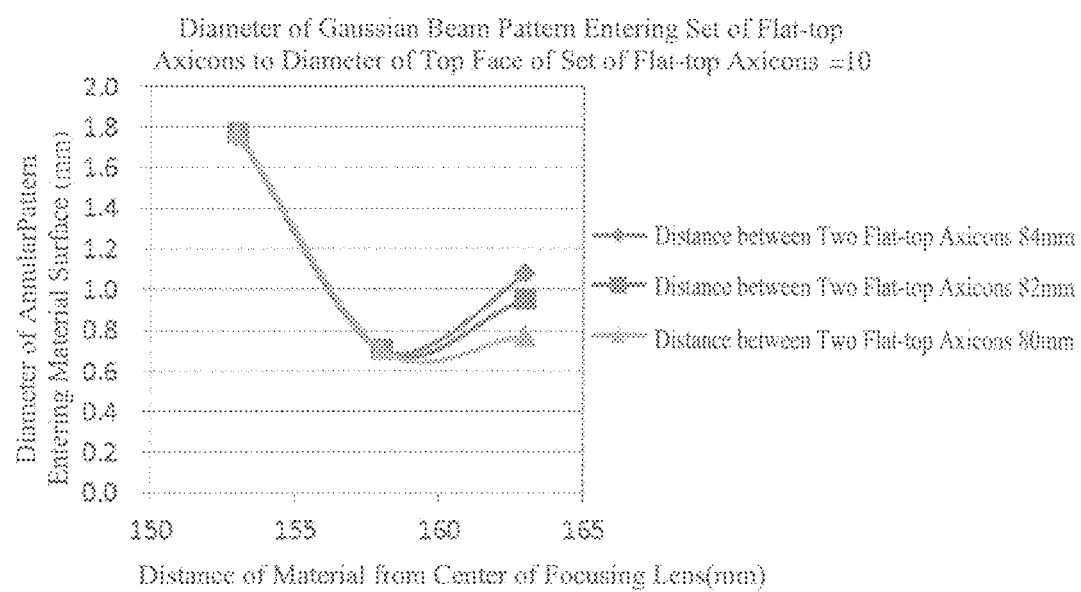

FIG. 6 is a graph depicting the relationship between the ratio of the diameter of the Gaussian beam pattern entering the flat-top conical lens set to the diameter of the top face of the incident flat-top axicon and the distance between the two flat-top axicons under the circumstances of different diameters of the Gaussian beam pattern entering the flat-top conical lens set. It should be noted that after light passes through the first flat-top axicon, some of the outer refracted light rays will have a refraction angle, and the distance between the second flat-top axicon and the first flat-top axicon (i.e., the distance between the two flat-top axicons) has to be limited within a certain range. This is because if the second flat-top axicon is too close to the first flat-top axicon, some of the refracted light rays will enter the flat top region of the flat-top axicon, such that the refraction will create unexpected refracted light rays instead of the parallel annular light rays output; if the two flat-top axicons are too far apart, some of the refracted light rays will be beyond the range receivable by the flat-top axicons. Both of these two situations above will cause energy loss, therefore the displacement of the second flat-top axicon should be within a certain range. The shaded area in FIG. 6 indicates such operating range for the distance between the two flat-top axicons. However, it should be noted that if the geometry of the flat-top conical lens set is changed, this range will change accordingly.

FIGS. 7A to 7E are graphs depicting the changes in relationships between the diameters of the annular patterns coming out of the sets of flat-top axicons and the distances of the materials from the centers of focusing lenses (i.e., the distances from focuses) as a result of different distances between the two flat-top axicons when the ratios of the diameters of the Gaussian beam patterns entering the sets of flat-top axicons to the diameters of the top faces of the incident flat-top axicons are 1.2, 2.5, 5, 7.5 and 10, respectively. It can be seen that the relationships between the diameters of the annular patterns coming out of the sets of flat-top axicons and the distances of the materials from the centers of focusing lenses are roughly V-shaped. In other words, a desirable diameter of the annular pattern hitting the material surface can be obtained by adjusting the diameter of the Gaussian beam pattern entering the flat-top conical lens set, the distance of the material from the center of the focusing lens, the diameter of the top face of the incident flat-top axicon and/or the distance between the two flat-top axicons, so as to further control characteristics such as the shape of the weld bead, heat distribution and the like.

Figures 1, 8A:
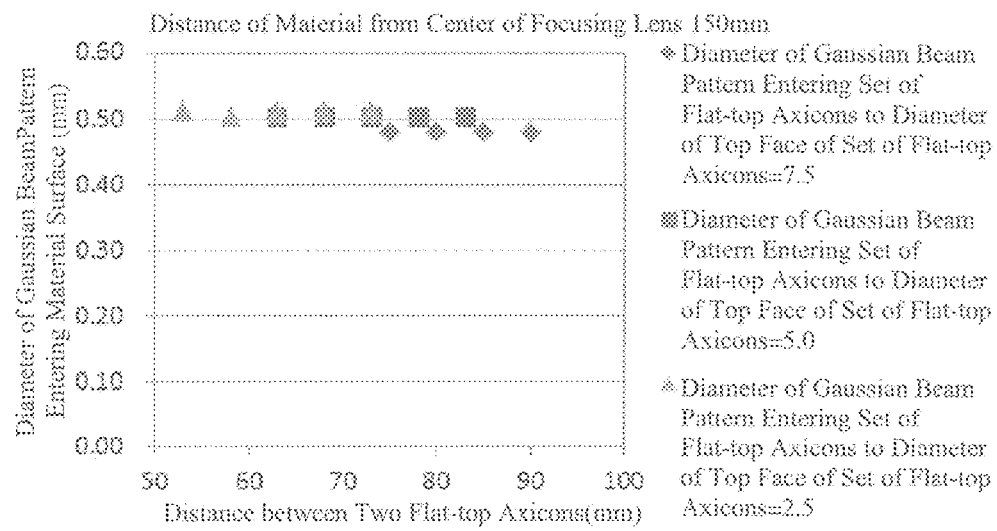
Figures 2, 8A:
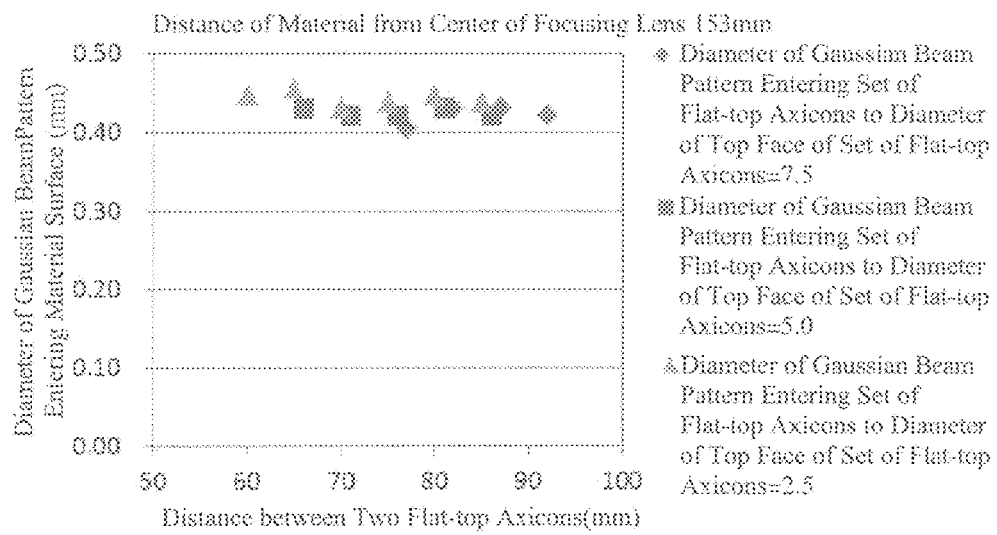
Figures 3, 8A:
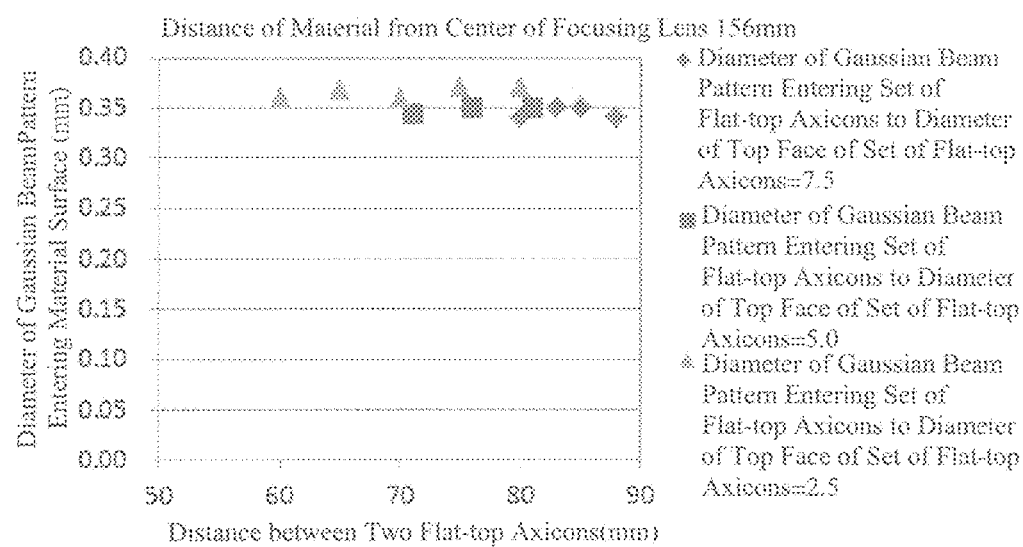
Figures 1, 8B:
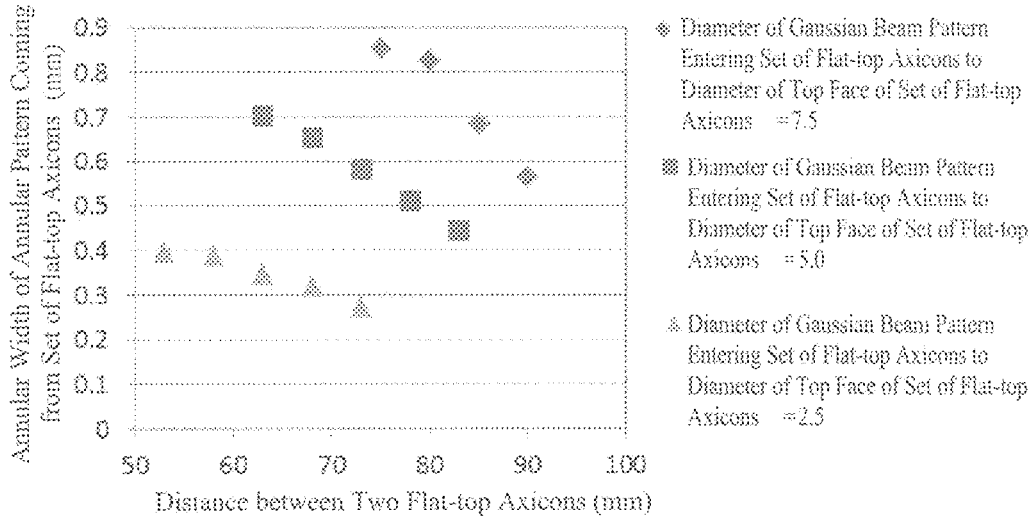
Figures 2, 8B:
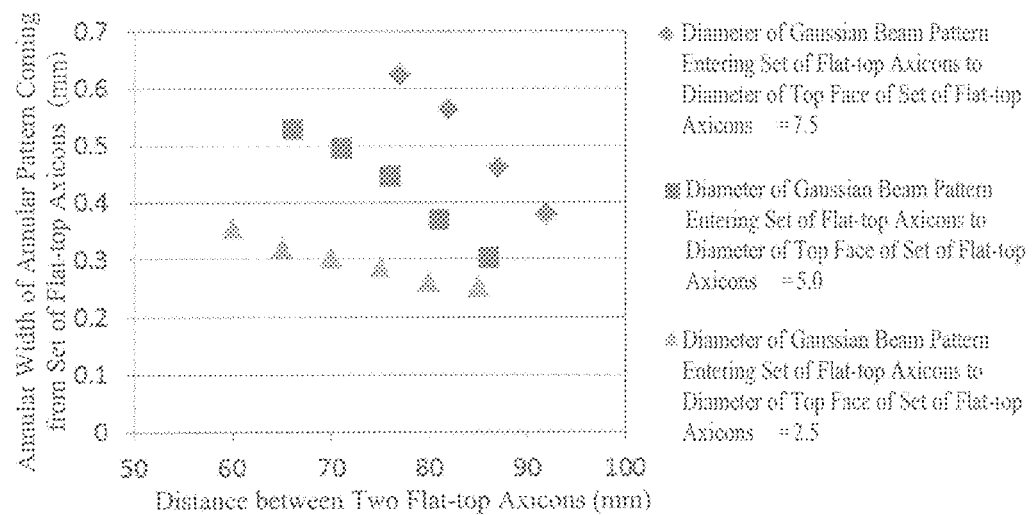
Figures 3, 8B:
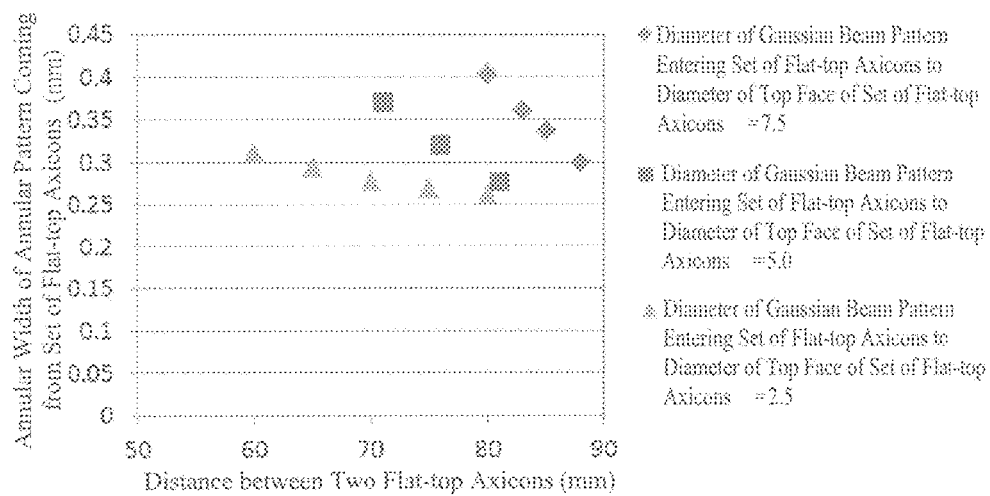

FIGS. 8A-1 to 8A-3 are graphs depicting relationships between the diameters of the Gaussian beam patterns hitting the material surfaces and the distances between the two flat-top axicons under the circumstances of different distances of the materials from the centers of focusing lenses (i.e., the distances from focuses) and different ratios of the diameters of the Gaussian beam patterns entering the flat-top conical lens sets to the diameters of the top faces of the incident flat-top axicons. It can be seen that the distance between the two flat-top axicons does not result in changes in the diameter of the Gaussian beam pattern hitting the material surface. Furthermore, FIGS. 8B-1 to 8B-3 are graphs depicting the relationships between the annular widths of the annular patterns hitting the material surfaces and the distances between the two flat-top axicons under the circumstances of different ratios of the diameters of the Gaussian beam patterns entering the flat-top conical lens sets to the diameters of the top faces of the incident flat-top axicons. It can be noted that the annular width of the annular pattern hitting the material surface increases along with an increase in the ratio of the diameter of the Gaussian beam pattern entering the sets of flat-top axicons to the diameter of the top face of the incident flat-top axicon, or the annular width of the annular pattern hitting the material surface decreases along with an increase in the distance between the two flat-top axicons. Therefore, a desirable annular width of the annular pattern hitting the material surface can be obtained by adjusting the ratio of the diameter of the Gaussian beam pattern entering the flat-top conical lens set to the diameter of the top face of the incident flat-top axicon or the distance between the two flat-top axicons, so as to further control characteristics such as the shape of the weld bead, heat distribution and the like.

As can be understood from the above descriptions with reference to FIGS. 5 to 8, characteristics such as the ratio of the output annular pattern energy to the total incident energy, the diameter of the Gaussian beam pattern entering the material surface, the ratio of the diameter of the Gaussian beam pattern entering the material surface to the diameter of the top face of the incident flat-top axicon, the diameter of the annular pattern entering the material surface, the annular width of the annular pattern entering the material surface or combinations thereof can be obtained by adjusting the diameter of the Gaussian beam pattern entering the flat-top conical lens set, the ratio of the diameter of the Gaussian beam pattern entering the flat-top conical lens set to the diameter of the top face of the incident flat-top axicon, the distance between the two flat-top axicons, the distance of the material from the center of the focusing lens of the device or combinations thereof for heating to generate a uniform molten pool in accordance with the present disclosure.

In summary, the present disclosure is capable of generating a uniform molten pool by employing a flat-top conical lens set that converts a Gaussian beam pattern entering the flat-top conical lens set into a combination of a Gaussian beam pattern with a reduced magnitude and an annular pattern, thereby preventing vaporization splash due to overheating of the material during melting. Also, weld beads approximate the shapes of rectangles can be obtained. As a result, it reduces the overlapping of the weld beads, thus improving the production rate of the manufacturing process.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A device for heating to generate a uniform molten pool, comprising:
   a source unit configured to generate an energy beam;
   a beam expanding/reducing unit positioned in an energy path of the energy beam and configured to adjust a diameter of the energy beam;
   a flat-top conical lens set positioned in the energy path and further comprising at least two flat-top axicons, with the beam expanding/reducing unit positioned between the source unit and the flat-top conical lens set; and
   a focusing lens for focusing the energy beam positioned in the energy path, wherein the flat-top conical lens set is positioned between the beam expanding/reducing unit and the focusing lens.

2. The device of claim 1, wherein the at least two flat-top axicons are a first flat-top axicon and a second flat-top axicon, the first flat-top axicon comprises a first top face, a first bottom face, and a first side face interconnecting the first top face and the first bottom face, a first angle is formed between the first side face and the first bottom face, the second flat-top axicon comprises a second top face, a second bottom face and a second side face interconnecting the second top face and the second bottom face, and a second angle is formed between the second side face and the second bottom face.

3. The device of claim 2, wherein the first top face and the second top face are positioned to face each other, and the first bottom face and the second bottom face are separated at a distance.

4. The device of claim 3, wherein the energy beam includes a Gaussian beam pattern, and a ratio of a diameter of the Gaussian beam pattern entering the flat-top conical lens set to a top face of the incident flat-top axicon is between 1 and 10.

5. The device of claim 2, wherein the first top face or the second top face has a diameter between 1 mm and 5 mm.

6. The device of claim 2, wherein the first angle or the second angle is between 5 degrees and 40 degrees.

7. The device of claim 2, wherein the first top face, the first bottom face and the first angle of the first flat-top axicon are different from the second top face, the second bottom face and the second angle of the second flat-top axicon, respectively.

8. The device of claim 2, wherein the first top face, the first bottom face and the first angle of the first flat-top axicon are the same as the second top face, the second bottom face and the second angle of the second flat-top axicon, respectively.

9. The device of claim 1, wherein a distance between two flat-top axicons is adjustable.

10. The device of claim 1, wherein the distance between the two flat-top axicons is between 40 mm and 85 mm.

11. The device of claim 1, wherein the energy beam entering the flat-top conical lens set has a Gaussian beam pattern or a multi-mode beam pattern.

12. The device of claim 11, wherein the Gaussian beam pattern entering the flat-top conical lens set has a diameter between 3 mm and 40 mm.

13. The device of claim 11, wherein an energy beam coming out of the flat-top conical lens set has a combination of a Gaussian beam pattern with a reduced magnitude and an annular pattern.

14. The device of claim 13, wherein the focusing lens has a diameter greater than a diameter of the annular pattern entering the focusing lens.

15. The device of claim 1, wherein the focusing lens has a focal length and configured to project the energy beam onto a material, wherein a distance of a surface of the material from the focus is between plus and minus 20 mm.

16. The device of claim 1, wherein the energy beam generated by the source unit is in a form of a point source or a collimated source.

17. The device of claim 16, wherein the beam expanding/reducing unit is a first convex lens, a combination of the first convex lens and a second convex lens, a combination of the first convex lens, the second convex lens and a concave lens, or a combination of the second convex lens and the concave lens.

18. The device of claim 16, further comprising a third convex lens positioned between the source unit and the beam expanding/reducing unit.

19. The device of claim 1, wherein the energy beam is an energy beam of high-energy rays, visible light, invisible light, microwave radiation, or a combination thereof.

20. The device of claim 19, wherein the energy beam is laser, a point source, or a light source emitted by laser via an optical fiber unit.

21. The device of claim 2, wherein the energy beam entering the flat-top conical lens set includes a Gaussian beam pattern, and the energy beam coming out of the flat-top conical lens set has a combination of a Gaussian beam pattern with a reduced magnitude and an annular pattern, a distance is kept between two flat-top axicons, and the focusing lens is configured to project the energy beam onto a material, and wherein a ratio of the output energy with the annular pattern to the total incident energy, a diameter of the Gaussian beam pattern entering a surface of the material, a diameter of the annular pattern entering the surface of the material, an annular width of the annular pattern entering the surface of the material or any combinations thereof are obtained by adjusting the diameter of the Gaussian beam pattern entering the flat-top conical lens set, the ratio of the diameter of the Gaussian beam pattern entering the flat-top conical lens set to the diameter of the top face of the incident flat-top axicon, the distance between the two flat-top axicons, the distance of the material from the center of the focusing lens, or any combinations thereof.

22. A device for heating to generate a uniform molten pool, comprising:
   a beam expanding/reducing unit positioned in an energy path of an externally-applied energy beam and configured to adjust a diameter of the externally-applied energy beam;
   a flat-top conical lens set positioned in the energy path and including at least two flat-top axicons, with the beam expanding/reducing unit positioned between a source of the externally-applied energy beam and the flat-top conical lens set; and
   a focusing lens for focusing the energy beam positioned in the energy path, wherein the flat-top conical lens set is positioned between the beam expanding/reducing unit and the focusing lens.

23. A device for heating to generate a uniform molten pool, comprising:

a beam expanding/reducing unit positioned in an energy path of an externally-applied energy beam and configured to adjust a diameter of the externally-applied energy beam;

a flat-top conical lens set positioned in the energy path and including at least two flat-top axicons, with the beam expanding/reducing unit positioned between a source of the externally-applied energy beam and the flat-top axicons conical lens set; and a focusing lens for focusing the energy beam positioned in the energy path, wherein the flat-top conical lens set is positioned between the beam expanding/reducing unit and the focusing lens, wherein the at least two flat-top axicons are a first flat-top axicon and a second flat-top axicon, the first flat-top axicon comprises a first top face, a first bottom face and a first side face interconnecting the first top face and the first bottom face and the second flat-top axicon comprises a second top face, a second bottom face and a second side face interconnecting the second top face and the second bottom face, and wherein the first top face and the second top face are oppositely disposed.

* * * * *